United States Patent
Rhee et al.

(10) Patent No.: US 8,121,565 B2
(45) Date of Patent: Feb. 21, 2012

(54) METHOD AND APPARATUS FOR RECEIVING DATA USING MULTIPLE ANTENNAS IN A COMMUNICATION SYSTEM

(75) Inventors: Jong-Hun Rhee, Suwon-si (KR); Min-Goo Kim, Yongin-si (KR); Young Mo Gu, Suwon-si (KR)

(73) Assignee: Samsung Electronica Co., Ltd. (KR)

( * ) Notice: Subject to any disclaimer, the term of this patent is extended or adjusted under 35 U.S.C. 154(b) by 698 days.

(21) Appl. No.: 11/961,179

(22) Filed: Dec. 20, 2007

(65) Prior Publication Data

US 2008/0153440 A1 Jun. 26, 2008

(30) Foreign Application Priority Data

Dec. 20, 2006 (KR) .................. 10-2006-0131418

(51) Int. Cl.
*H04B 17/02* (2006.01)
(52) U.S. Cl. ......... 455/137; 455/440; 455/450; 455/522
(58) Field of Classification Search ............. 455/137
See application file for complete search history.

(56) References Cited

U.S. PATENT DOCUMENTS

| 6,128,355 | A | * | 10/2000 | Backman et al. | 375/347 |
| 6,128,498 | A | * | 10/2000 | Benveniste | 455/450 |
| 6,600,933 | B1 | * | 7/2003 | Hiramatsu et al. | 455/561 |
| 2006/0050773 | A1 | * | 3/2006 | Yano | 375/148 |
| 2006/0083195 | A1 | | 4/2006 | Forenza et al. | |
| 2006/0286996 | A1 | * | 12/2006 | Julian et al. | 455/522 |
| 2008/0182580 | A1 | * | 7/2008 | Laroia et al. | 455/440 |

FOREIGN PATENT DOCUMENTS

KR 1020060022630 3/2006

* cited by examiner

*Primary Examiner* — Duc Nguyen
*Assistant Examiner* — Ajibola Akinyemi
(74) *Attorney, Agent, or Firm* — The Farrell Law Firm, P.C.

(57) ABSTRACT

A method and apparatus for receiving data using multiple antennas in a communication system are provided. A received signal-combining scheme is determined according to the strength of an interference signal included in the signals received from the antennas. The signals received from the antennas are combined according to the determined received signal-combining scheme. In this manner, the method and apparatus adaptively use a received data-combining scheme according to the channel condition, thereby ensuring optimal reception performance.

11 Claims, 7 Drawing Sheets

METHOD AND APPARATUS FOR RECEIVING DATA USING MULTIPLE ANTENNAS IN A COMMUNICATION SYSTEM

PRIORITY

This application claims priority under 35 U.S.C. §119(a) to a Korean Patent Application filed in the Korean Intellectual Property Office on Dec. 20, 2006 and assigned Serial No. 2006-131418, the disclosure of which is incorporated herein by reference.

BACKGROUND OF THE INVENTION

1. Field of the Invention

The present invention relates generally to a method and apparatus for receiving data in a communication system, and more particularly, to a method and apparatus for receiving data after interference signals are cancelled by a terminal using multiple antennas in a wireless mobile communication system.

2. Description of the Related Art

In cellular mobile communication systems such as Code Division Multiple Access (CDMA), Wideband CDMA (WCDMA), and High Speed Downlink Packet Access (HS-DPA) systems, a terminal receives data using multiple antennas. When the terminal is located at a boundary between a serving base station and an adjacent base station, a dual signal phenomena may occur, which is described in greater detail below.

Figure 1:
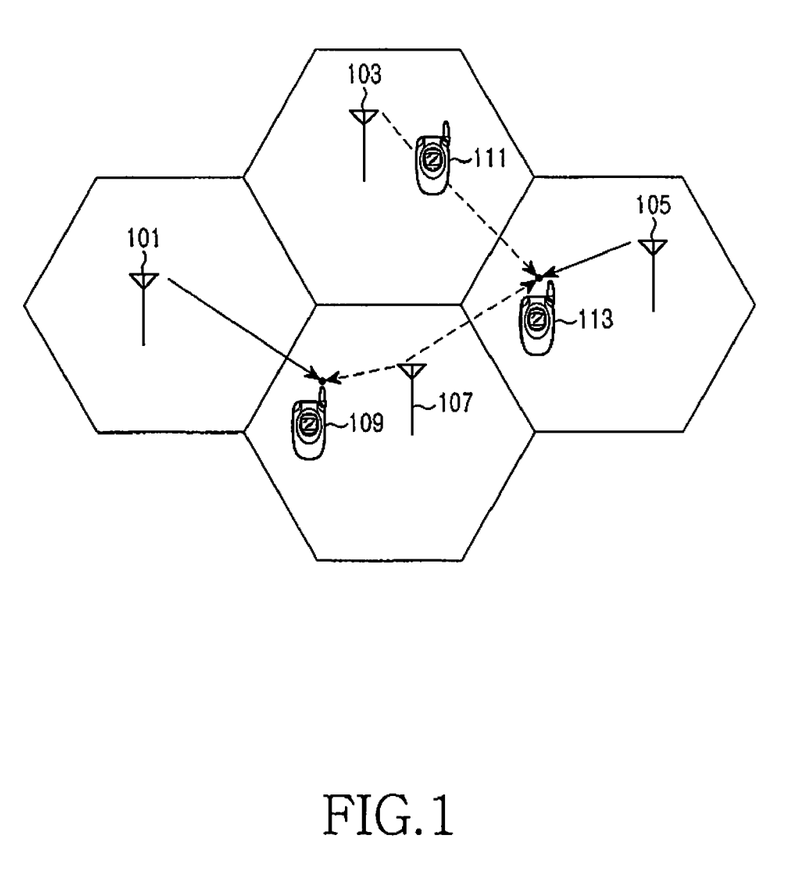
FIG. 1 is a diagram illustrating signal reception according to terminal positions in a cellular communication system.

FIG. 1 illustrates signal reception according to terminal positions in a cellular communication system.

As illustrated in FIG. 1, terminals 109 and 113 located in the cell boundaries receive not only the signals of their respective serving base stations 101 and 105, but also the signals of adjacent base stations 103 and 107, at similar strength. However, the signals of the adjacent base stations 103 and 107 serve as interference signals, causing a reduction in reception performance of the terminals 109 and 113. Therefore, in order to increase the reception performance of the terminals 109 and 113 in the cell boundaries, there is a need for techniques for canceling interference signals from adjacent base stations, as well as a receiver capable of canceling the interference signals.

Several methods such as the Minimum Mean Square Error (MMSE) scheme are used to cancel the interference signals. The terminals 109 and 113, located in the vicinity of their serving base stations, and thus having low power interference signals, use a reception method based on a Maximum Ratio Combining (MRC) scheme so as to perform accurate channel estimation thereon. Unfortunately, the MMSE scheme is greatly affected by noise, and the MRC scheme, though it guarantees a high reception performance, suffers from a reduction in the reception performance when the channel varies quickly.

The current mobile communication system, in which terminals each use multiple antennas, applies only a single reception method to the multiple antennas. Therefore, the mobile communication system does not take into consideration the amount of interference signals, making it difficult to guarantee optimal reception performance according to the positions of the terminals. In addition, optimal reception performance cannot be ensured using only the MMSE reception method, and the amount of interference received from other base stations should also be taken into consideration.

SUMMARY OF THE INVENTION

The present invention has been made to address at least the above problems and/or disadvantages and to provide at least the advantages described below. Accordingly, an aspect of the present invention provides a method and apparatus for efficiently receiving data taking the amount of interference signals into account in a mobile communication system using multiple antennas.

Another aspect of the present invention provides a method and apparatus for optimizing the data throughput taking the positions of terminals into account in a mobile communication system using multiple antennas.

According to one aspect of the present invention, a reception apparatus including multiple receive antennas in a communication system is provided. The reception apparatus includes a interference signal controller for measuring signals received from the antennas, and determining one of at least two received signal combining schemes according to strength of an interference signal included in the signals. The reception apparatus also includes at least two signal combiners for combining the signals received from the antennas according to the determined received signal-combining scheme. The reception apparatus further includes an antenna path selector for delivering the signals received from the antennas to one of the at least two signal combiners according to the determined received signal combining scheme.

According to another aspect of the present invention, a method for receiving a signal using multiple antennas in a communication system is provided. Strengths of signals received from the antennas are measured. One of at least two signal combining schemes is determined according to a ratio of strength of received signals from interference base stations that provide interference signals among the signals, to strength of a received signal from a serving base station that presently provides a service signal. The signals received from the antennas are combined using the determined signal-combining scheme.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention are described in detail with reference to the accompanying drawings. In the drawings, the same or similar elements are denoted by the same or similar reference numerals even though they are depicted in different drawings. Detailed descriptions of constructions or processes known in the art may be omitted to avoid obscuring the subject matter of the present invention.

The embodiments of the present invention provide a method and apparatus for adaptively receiving data according to strengths of interference signals to efficiently receive data by a terminal using multiple antennas in a mobile communication system.

To this end, a data reception apparatus according to embodiments of the present invention is first described, and then, a data reception method according thereto is described. Embodiments of the present invention can be applied to the cellular mobile communication system including terminals with multiple antennas. However, the data reception method according to embodiments of the present invention is not limited to particular mobile communication and cellular standards, and can be generally applied to the communication system where the state of interference signals varies according to the channel environment. For convenience, a description of embodiments of the present invention will be made herein with reference to a Wireless Broadband (WiBro) system based on the 802.16e standard.

An embodiment of the present invention uses a first reception scheme for estimating channels and combining signals based on a fixed number of pilot signals on the basis of a threshold predetermined depending on strengths of interference signals to adaptively receive data according to the strengths of the interference signals. A second reception scheme is used for estimating channels and combining signals based on a variable number of pilot signals for canceling the interference signals.

Embodiments of the present invention herein use the MRC scheme and the MMSE scheme as the first reception scheme and the second reception scheme, respectively. For a better understanding of the embodiments of the present invention, the MRC scheme and the MMSE scheme will first be described with reference to FIGS. 2 to 4.

Figure 2:
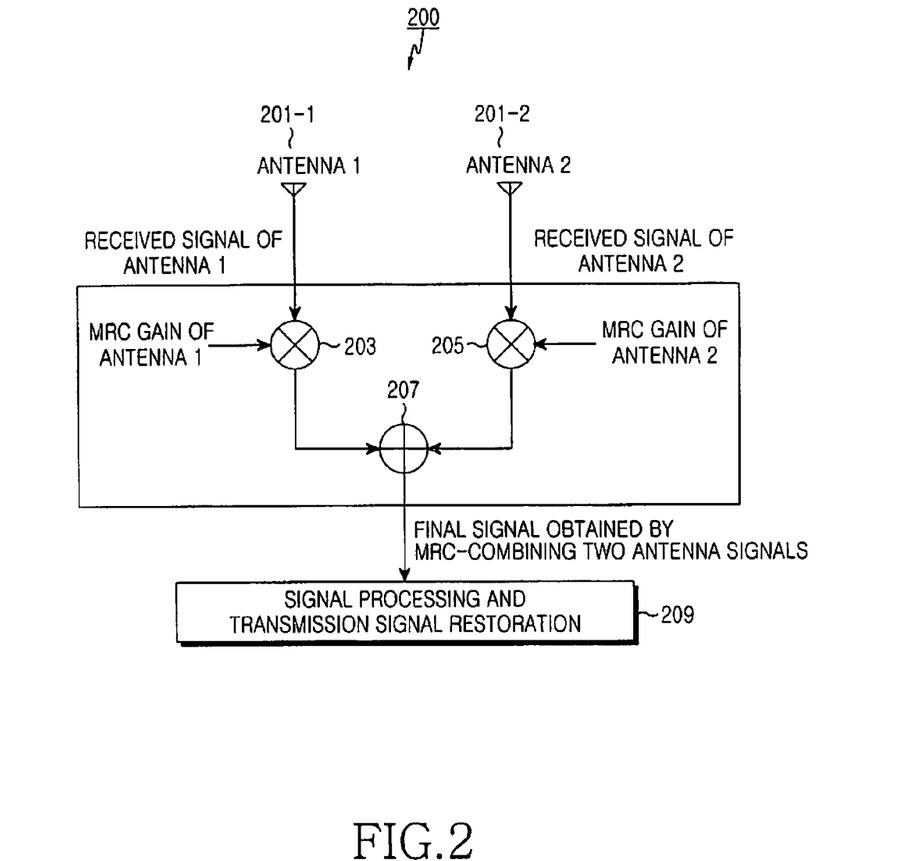
FIG. 2 is a diagram illustrating an MRC reception scheme, according to an embodiment of the present invention.

FIG. 2 illustrates an MRC reception scheme, according to an embodiment of the present invention.

Referring to FIG. 2, an MRC receiver 200 includes multiple antennas 201-1 and 201-2, multipliers 203 and 205, a combiner 207, and a signal processing and transmission signal restoration unit 209. The signals separately received via the antennas 201-1 and 201-2 are multiplied by gain values of the antennas while passing through the multipliers 203 and 205 associated with the corresponding antennas. The signals multiplied by the gain values of the antennas are combined by the combiner 207, generating the final signal. In the MRC reception scheme, the gain values of the antennas are determined based on the characteristics of the signals and noises received at the antennas. Therefore, only the diversity gain can be obtained through the combination of the signals received from the two antennas.

Figure 3:
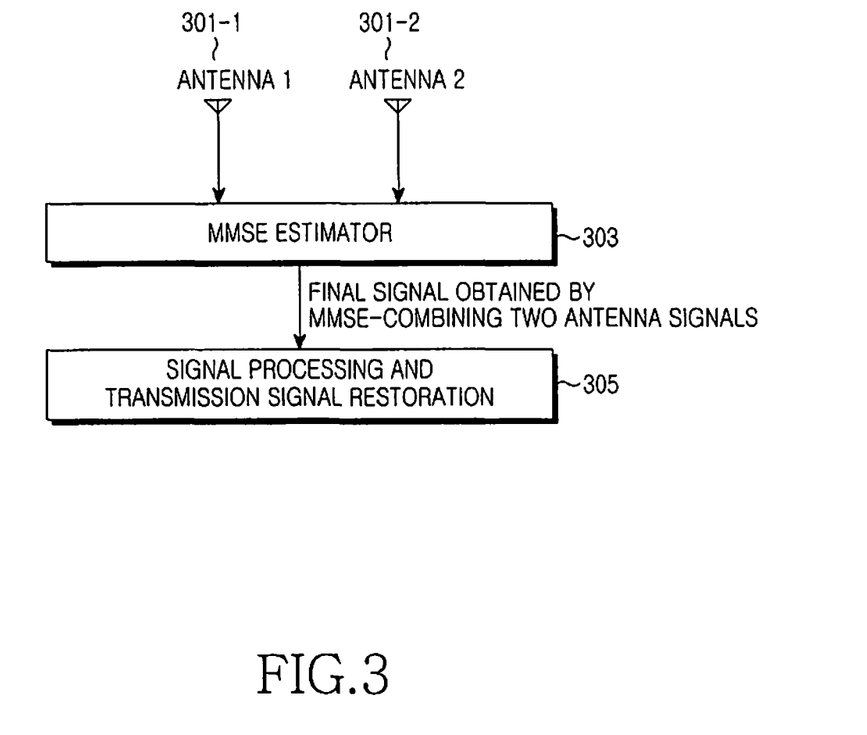
FIG. 3 is a diagram illustrating an MMSE reception scheme, according to an embodiment of the present invention.

FIG. 3 illustrates an MMSE reception scheme, according to an embodiment of the present invention.

Referring to FIG. 3, an MMSE receiver 300 includes multiple antennas 301-1 and 301-2, an MMSE estimator 303, and a signal processing and transmission signal restoration unit 305. The MMSE receiver 300 makes an MMSE linear equation from the sizes of the channels and noises estimated from the signals received via the antennas 301-1 and 301-2, and determines an MMSE combination coefficient between the antennas 301-1 and 301-2 by solving this equation. The MMSE linear equation uses the correlation characteristic between receive antennas. It is possible to obtain a combination coefficient capable of canceling the interference component that has affected the correlation characteristic between the antennas in the process of solving the MMSE linear equation. To measure the correlation characteristic between antennas, the receiver needs multiple pilot signals.

Next, a description of a clear relationship between the pilot signal and channel estimation will be made with reference to the WiBro system to which embodiments of the present invention are applied.

Figure 4:
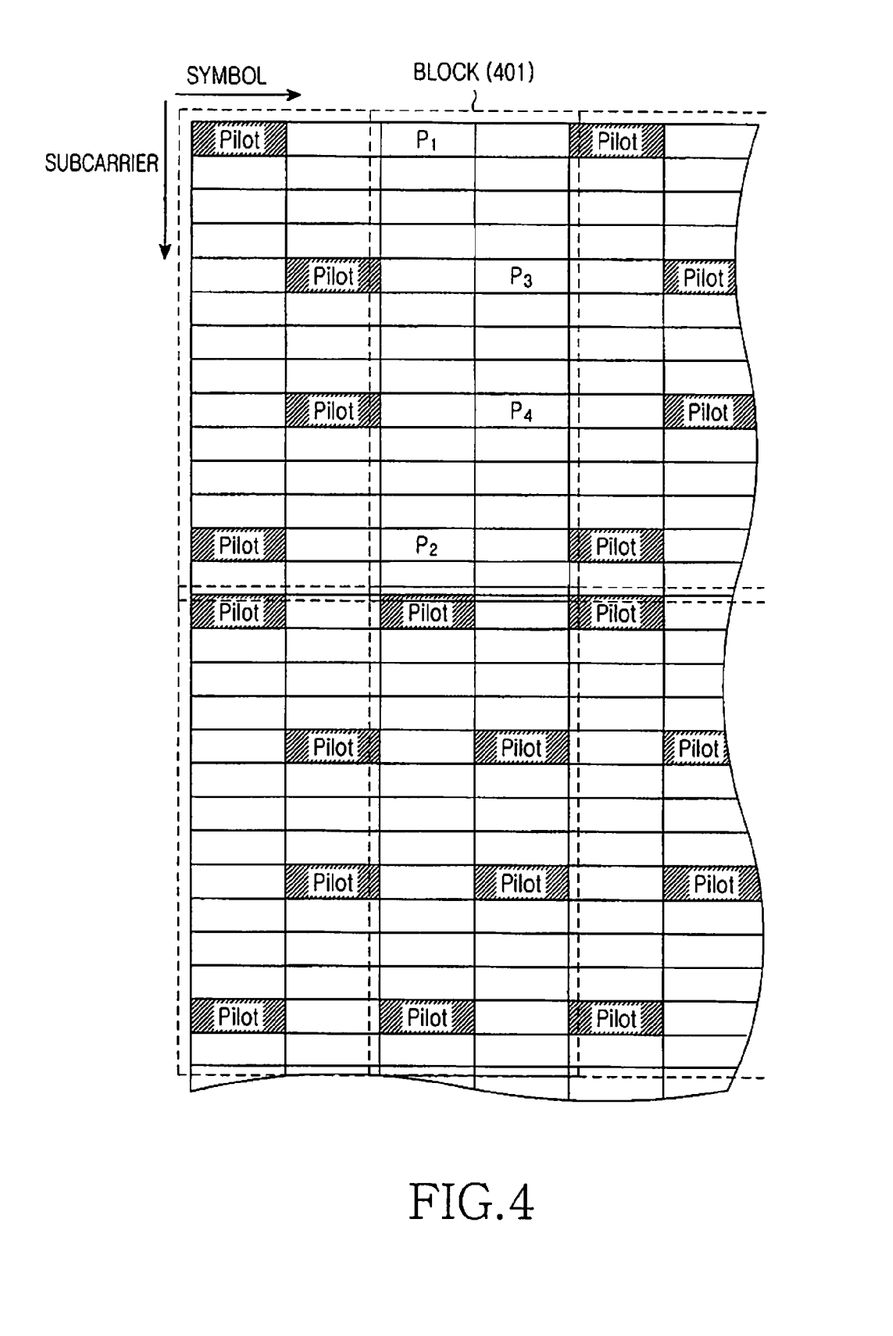
FIG. 4 is a diagram illustrating positions of data signals and pilot signals in a WiBro system, according to an embodiment of the present invention.

FIG. 4 illustrates positions of data signals and pilot signals in a WiBro system, according to an embodiment of the present invention.

In FIG. 4, pilot signal regions denoted by 'Pilot' or 'P' are used for estimating a channel as described above, and the other data signal regions are used for transferring data.

When the pilot signals and the data signals are disposed as shown in FIG. 4, a block 401 is established as shown in FIG. 4 to receive signals using the MMSE scheme. The block 401 is composed of signals that are consecutive in the time domain and the frequency domain, and in the example of FIG. 4, the block 401 is composed of a total of 28 signals including 2 symbols and 14 subcarriers. A size of the block has a close relationship with the channel correlation characteristic along the time domain and the frequency domain. Therefore, the receiver measures a correlation along the time domain and the frequency domain, and defines the interval in which correlations of the time domain and the frequency domain are greater than or equal to a particular value as the time domain and the frequency domain of each block.

In the block 401, the lightly shaded regions $P_1$, $P_2$, $P_3$ and $P_4$ indicate positions of the pilots in the selected block. Because this block is selected in the region where a correlation with the channel is high, it should be assumed that the channel state in the corresponding block scarcely changes. If the channel state in the block undergoes considerable change, the actual reception performance deteriorates. The reason can be appreciated from Equation (1) for MMSE reception scheme.

$$x^k = w[y_1^k \ y_2^k] \qquad (1)$$

In Equation (1), k denotes an index indicating each data signal region in the block, $y_i$ denotes a signal received via an $i^{th}$ receive antenna, and x denotes a value of the final signal obtained by the MMSE receiver 300. An MMSE channel estimation coefficient w has a constant value in the block 401 of FIG. 4, and is defined as Equation (2).

$$w = E(xy^H)(E(yy^H))^{-1} \qquad (2)$$

In Equation (2), $E(xy^H)$ denotes a mean of a product of a transmission signal and a received signal, defining a correlation between the two signals. In addition, $(E(yy^H))^{-1}$ is an inverse matrix of an autocorrelation of the received signal. These two terms can be rewritten as Equation (3) and Equation (4) for FIG. 4, respectively.

$$E(xy^H) = \frac{1}{J}\sum_{j=1}^{J} x^j [y_1^j \ y_2^j]^* \qquad (3)$$

$$E(yy^H) = \frac{1}{J}\sum_{j=1}^{J} [y_1^j \ y_2^j]^T [y_1^j \ y_2^j]^* \quad (4)$$

In Equation (3) and Equation (4), * denotes a conjugate complex operation on each element, and T denotes a transpose matrix of the corresponding matrix. In Equation (3), because the receiver should know a transmission signal x, this calculation should be performed in the pilot signal region of the interval in which the transmission value is previously determined. Therefore, the data used for the calculations of Equation (3) and Equation (4) uses only the signals disposed in the pilot positions in the calculation block. In addition, because J denotes the total number of pilot signals in the block, means of the left sides of Equation (3) and Equation (4) are a mean value of the signals obtained in the positions of the pilot signals in the block. Therefore, accuracy of the estimated mean value increases with the size of the block. However, if the channel environment varies fast with respect to the frequency domain or the time domain, the varying channel values become inaccurate due to the mean calculation, so the accurate channel estimation fails, causing a reduction in the reception performance. Therefore, if there is a case where there is no loss of the channel estimation coefficient even though the size of the block is set without considering the channel variation characteristic, it is possible to compensate for the performance reduction caused by the block size estimation by fixing the size of the block to a particular value. A description of this case is described in greater detail below.

It is well known that the MMSE reception scheme, when using N antennas, cancels (N−1) interference signals. This is because when N transmission signals are assumed as unknown signals, N transmission signals are estimated by making N MMSE linear equations from the signals received via N antennas. That is, one of the N transmission signals obtained by the MMSE linear equations is a service signal. Therefore, it is possible to estimate a service signal from which the remaining (N−1) interference components are cancelled.

The MMSE reception scheme cancels one interference signal by performing an MMSE operation on the signals received via two antennas. Therefore, when there is no interference signal, the two reception schemes theoretically have the same reception characteristics. However, when errors have occurred in the block selection process in realization of the MMSE scheme presented in the foregoing equations, it may bring degradation of the reception performance. Therefore, when there is no interference signal, it is possible to optimize the performance by realizing the terminal with the MRC scheme.

In the embodiments of the present invention, therefore, the receiver located in the vicinity of the base station receives signals with the MRC scheme, because it is scarcely affected by interference. The receiver located far from the base station receives signals with the MMSE scheme, because it is considerably affected by interference. This allows for optimal performance.

Figure 5:
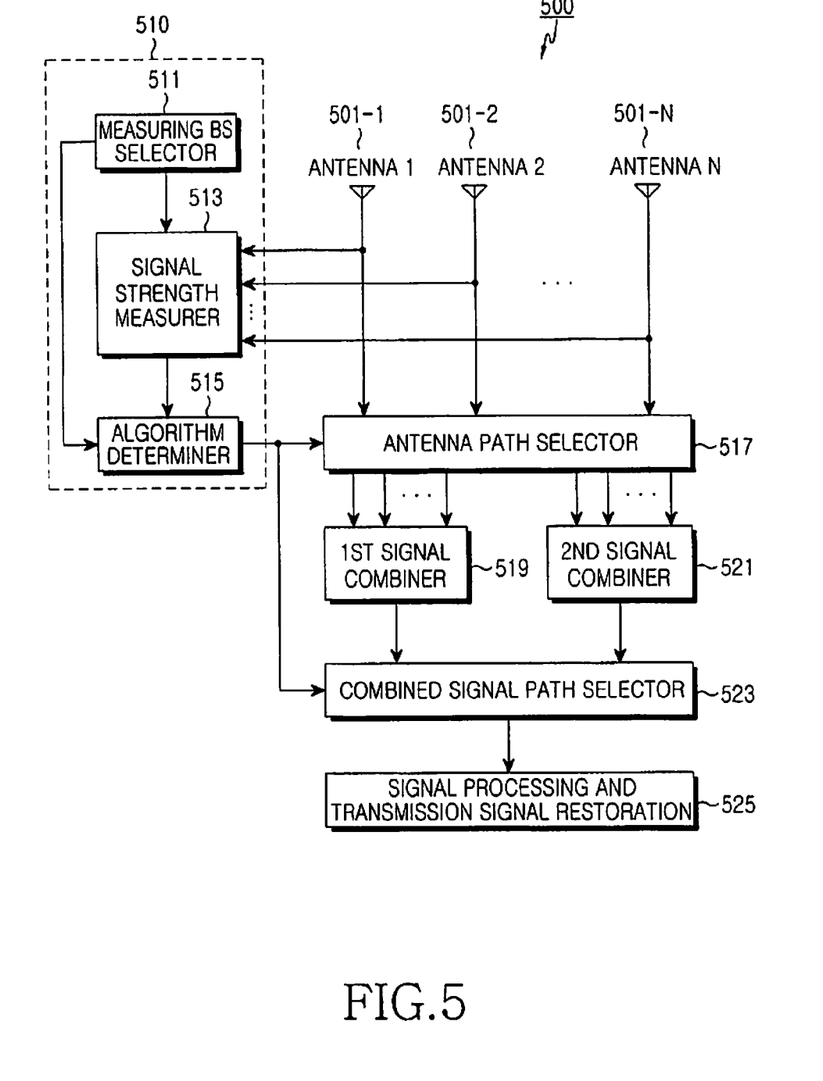
FIG. 5 is a diagram illustrating a data reception apparatus, according to an embodiment of the present invention.

FIG. 5 illustrates a data reception apparatus, according to an embodiment of the present invention.

Referring to FIG. 5, a data reception apparatus 500 according to an embodiment of the present invention includes N antennas 501-1 to 501-N, an interference signal controller 510, an antenna path selector 517, a first signal combiner 519, a second signal combiner 521, a combined signal path selector 523, and a signal processing and transmission signal restoration unit 525.

The N antennas 501-1 to 501-N receive signals transmitted from multiple Base Stations (BSs), and the number of antennas is subject to change according to the terminal. The interference signal controller 510 controls the scheme of measuring strengths of the signals received from the base stations via N receive antennas, and combines the received signals according to the channel conditions. To this end, the interference signal controller 510 includes a measuring base station selector 511, a signal strength measurer 513, and an algorithm determiner 515.

The measuring base station selector 511 selects a base station from which the data reception apparatus 500 will receive a signal. The signal strength measurer 513 measures strength of the signal received from the base station selected by the measuring base station selector 511, using the power or energy value. As to the signal strength measurement interval for the base station, a preamble interval is preferable in the WiBro system, and similarly, a signal interval that ensures orthogonality between signals of base stations and indicates a pilot pattern is appropriate in other systems.

The signals received via the antennas are combined as expressed in Equation (5), generating the final signal.

$$P^i = \sum_{n=1}^{N} |p_n^i|^2 \quad (5)$$

In Equation (5), $|p_n^i|^2$ denotes a value obtained by measuring the signal transmitted by an $i^{th}$ base station, received via an $n^{th}$ antenna, and as described above, this means the power or energy value measured in the pilot interval suitable to measure signals of the base stations.

The algorithm determiner 515 compares the highest-strength signal among the signals received from the base station that causes an interference signal (hereinafter, "interference base station"), with the signal from the serving base station in terms of the strength, and controls a combining scheme of each antenna depending on the comparison result. Specifically, the algorithm determiner 515 measures a ratio of strength of the interference signal from the interference base station to strength of the signal from the serving base station, and if this value is greater than a threshold, the algorithm determiner 515 sets the block size to the minimum size determined such that the receiver can remove an influence of the noises. In addition, the algorithm determiner 515 performs an operation of estimating a channel from the pilot signals in the block and estimating a coefficient at which multiple antennas are combined such that a signal-to-noise ratio is maximized.

However, if the strength ratio of the highest-strength signal from the interference base station to the signal from the serving base station is less than or equal to the threshold, this means that there is a need to cancel the interference signal. Therefore, the algorithm determiner 515 performs an operation of finding an interference cancellation channel estimation coefficient from the pilot signals, the number of which is variably set, in the block, such that the receiver can perform an interference cancellation operation.

The antenna path selector 517, under the control of the algorithm determiner 515, transfers the signals transmitted from the antennas to the first signal combiner 519 and the second signal combiner 521. The number of the first signal combiner 519 and the second signal combiner 521 is extendable according to the channel conditions. For example, signal combiners based on a fixed number of pilot signals for maximizing the signal-to-noise ratio and signal combiners based on a variable number of pilot signals for canceling the interference signals can be provided.

Thereafter, the signals combined according to the reception schemes are restored to the original transmission signal through the combined signal path selector 523 and the signal processing and transmission signal restoration unit 525.

Figure 6:
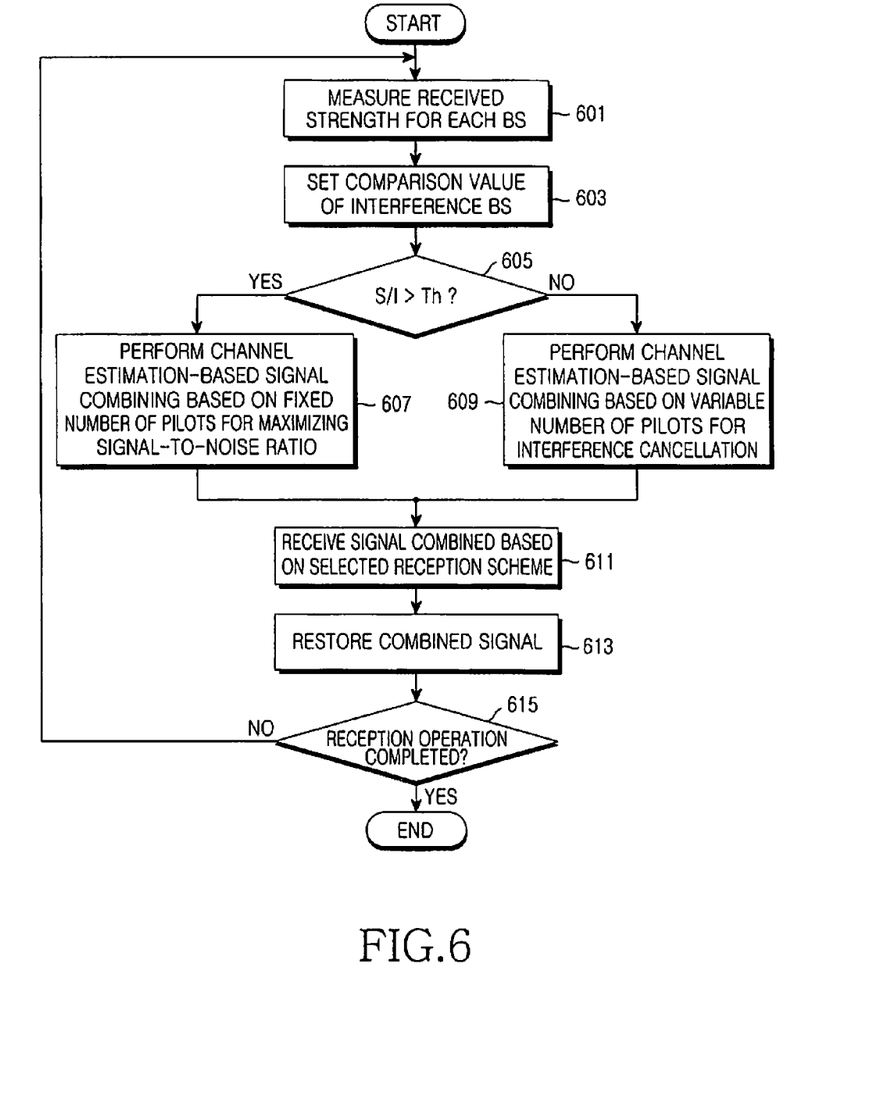
FIG. 6 is a flow diagram illustrating a method for receiving data in a data reception apparatus, according to an embodiment of the present invention.

FIG. 6 illustrates a method for receiving data in a data reception apparatus, according to an embodiment of the present invention. The method shown in FIG. 6 adaptively processes the received data according to the channel state.

Referring to FIG. 6, upon receipt of a signal from the exterior, a data reception apparatus 500 according to an embodiment of the present invention measures strengths of signals received from base stations including the serving base station, to determine a data reception scheme in step 601. Thereafter, in step 603, the data reception apparatus 500 determines a comparison value to be compared with a threshold, using the strength of the signal received from the serving base station and the strength of the interference signal from the interference base station. If the strength of the received signal from the serving base station and the strength of the interference signal from the interference base station are denoted by S and I, respectively, the comparison value is defined as S/I. The I can be selected through several methods. For example, the I can be determined as the highest strength among the strengths of the received signals from the interference base station, or the I can be determined as a sum of the strengths of all interference signals from the interference base station.

If an index of the serving base station is given as '0' in Equation (5), S can be expressed as Equation (6).

$$S = P^0 \quad (6)$$

In Equation (6), $P^0$ denotes transmission power of a $0^{th}$ base station.

In addition, the I given for the case where it is the highest strength among the strengths of the received signals from the interference base station, and the I given for the case where it is the strength of the sum of all interference signals from the interference base station, can be expressed as Equation (7) and Equation (8), respectively.

$$I = \max_{i \neq 0} P^i \quad (7)$$

$$I = \sum_{i \neq 0} P^i \quad (8)$$

When the S, the I, and the comparison value S/I are determined in this way, the data reception apparatus 500 compares S/I with a predetermined threshold Th in step 605. If the S/I is greater than the threshold Th, the data reception apparatus 500 proceeds to step 607 where it performs the signal combining based on a fixed number of pilots for maximizing the signal-to-noise ratio. For example, the MRC reception scheme is available as the signal combining. However, if the S/I is less than or equal to the threshold Th, the data reception apparatus 500 proceeds to step 609 where it performs a signal combining process through channel estimation based on a variable number of pilots for interference cancellation. For example, the MMSE reception scheme is available as the signal combining process.

Thereafter, the data reception apparatus 500 receives a signal combined according to the selected reception scheme in step 611, and restores the combined signal in step 613. The data reception apparatus 500 determines in step 615 whether the inter-antenna signal reception operation has been completed. If the data reception operation has not completed yet, the data reception apparatus 500 returns to step 601, and repeatedly performs steps 601 to 613. That is, the data reception apparatus 500 repeatedly performs steps 601 to 613 until the reception operation is completed.

As described above, the data reception apparatus 500 proposed by embodiments of the present invention adaptively selects an inter-antenna signal combining method according to the amount of interference of the received signal, combines the signals using the selected combining method, and then restores the combined signal.

Figure 7:
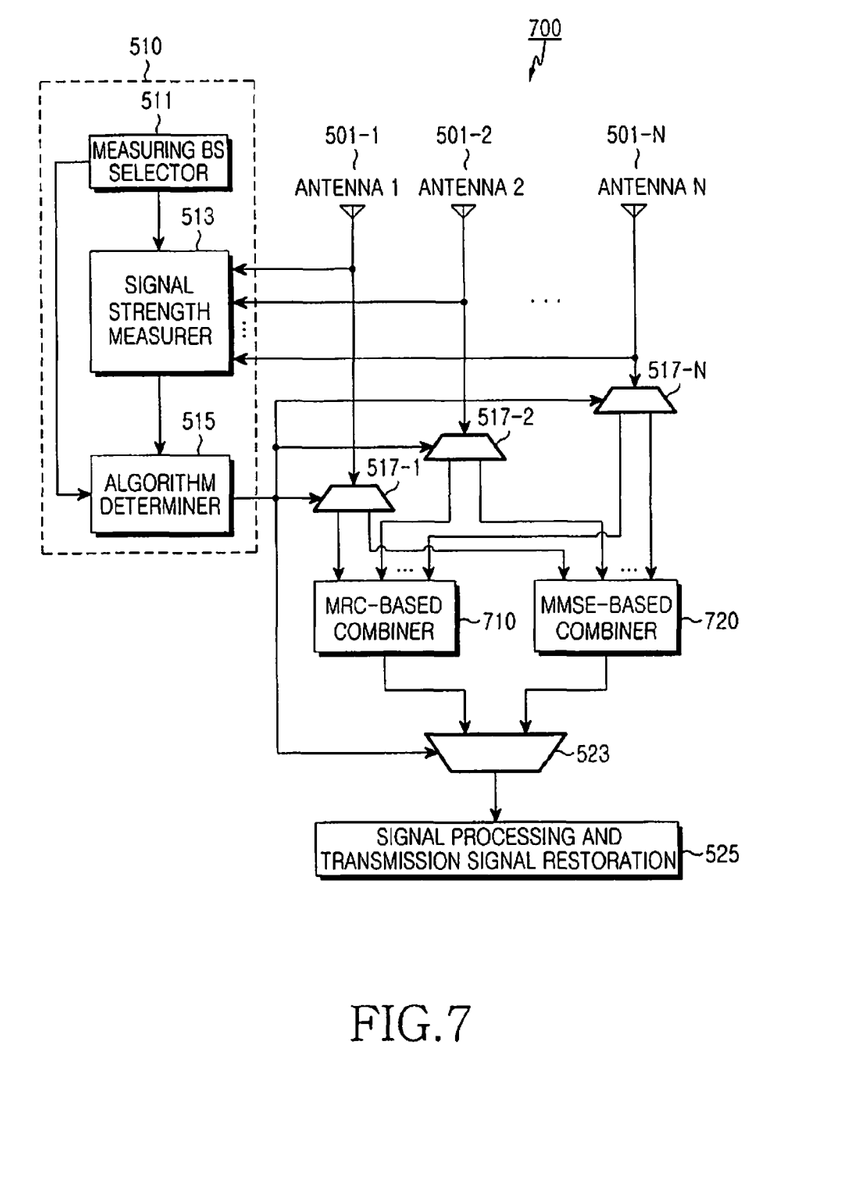
FIG. 7 is a diagram illustrating an exemplary realization of a data reception apparatus, according to an embodiment of the present invention.

FIG. 7 illustrates an exemplary realization of a data reception apparatus according to an embodiment of the present invention, wherein the antenna path selector 517 and the combined signal path selector 523 of FIG. 5 are realized with a demultiplexer(s) (DEMUX) and a multiplexer (MUX), respectively.

Referring to FIG. 7, an MRC-based combiner 710 is applied as an example of the combiner that estimates a channel and combines signals based on a fixed number of pilot signals among the reception schemes according to an embodiment of the present invention, and an MMSE-based combiner 720 is applied as an example of the combiner that estimates a channel and combines signals based on a variable number of pilot signals. The measuring base station selector 511, the signal strength measurer 513, the algorithm determiner 515, and the signal processing and transmission signal restoration unit 525 are equal to the corresponding elements in FIG. 5.

When the algorithm determiner 515 selects the MRC-based combiner 710, demultiplexers 517-1 to 517-N operate such that the received signals from the antennas 501-1 to 501-N are input to the MRC-based combiner 710. A multiplexer 523 controls a signal flow such that the output signal of the MRC-based combiner 710 is input to the signal processing and transmission signal restoration unit 525.

However, when the algorithm determiner 515 selects the MMSE-based combiner 720, the demultiplexers 517-1 to 517-N operate such that the received signals from the antennas 501-1 to 501-N are input to the MMSE-based combiner 720. The multiplexer 523 controls a signal flow such that the output signal of the MMSE-based combiner 720 is input to the signal processing and transmission signal restoration unit 525.

Summarizing the data reception method of the embodiments of the present invention, the data reception apparatus, when it has multiple antennas, combines signals received from the antennas taking into account the amount of interference signals received from other base stations. If the amount of interference signals is less than a threshold, the data reception apparatus finds a combination coefficient by setting the fixed number of pilot signals to maximize a signal-to-noise ratio of the received signal. However, if the amount of interference signals is greater than a threshold, the data reception apparatus finds an interference cancellation combination coefficient by setting the variable number of pilot signals to cancel the interference signal from the received signal, and processes the received signal according thereto. Therefore, in an interference-rich place like the cell boundary, the terminal adaptively enables the MMSE-based reception method, thereby increasing the reception performance in the cell boundary and thus increasing the cell coverage. However, in the vicinity of the transmitter (or serving base station), the terminal selects the MRC-based reception method, thereby removing the loss occurring in the MMSE-based reception algorithm and thus increasing the maximum data rate.

As is apparent from the foregoing description, when the strength of the interference signal in the received signal is higher than a threshold, embodiments of the present invention set a fixed number of pilot signals, thereby performing a combining process based on the combination coefficient estimation. Otherwise, embodiments of the present invention set a variable number of pilot signals to cancel the interference signal from the received signal, thereby performing a combining process based on the combination coefficient estimation. In this manner, embodiments of the present invention can optimize the reception performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A reception apparatus having multiple receive antennas in a communication system, the apparatus comprising:
    an interference signal controller for measuring signals received at the multiple receive antennas, and determining one of at least two received signal combining schemes according to a ratio of strength of a received signal from a serving base station that presently provides a service signal, to strength of received signals from interference base stations that provide interference signals from among the signals received at the multiple receive antennas;
    at least two signal combiners for combining the signals received at the multiple receive antennas according to the determined received signal combining scheme; and
    an antenna path selector for delivering the signals received at the multiple receive antennas to one of the at least two signal combiners according to the determined received signal combining scheme,
    wherein the interference signal controller determines a first scheme for combining the signals based on a fixed number of pilots if the ratio is greater than a predetermined threshold and determines a second scheme for combining the signals based on a variable number of pilots if the ratio is less than or equal to the predetermined threshold.

2. The reception apparatus of claim 1, wherein the interference signal controller comprises:
    a measuring base station selector for selecting the signal received from the serving base station;
    a signal strength measurer for measuring a power value of the signal transmitted from the selected serving base station, and power values of the interference signals received from the interference base stations; and
    an algorithm determiner for determining the first scheme or the second scheme according to the ratio of strength of the interference signals from the interference base stations to the strength of the received signal from the serving base station.

3. The reception apparatus of claim 2, wherein the signal strength measurer measures signal strength using:

$$P^i = \sum_{n=1}^{N} |p_n^i|^2$$

where $|p_n^i|^2$ denotes a value obtained by measuring strength of the signal transmitted by an $i^{th}$ base station, received via an $n^{th}$ antenna.

4. The reception apparatus of claim 1, wherein the at least two signal combiners comprise a signal combiner for combining received signals with a Maximum Ratio Combining (MRC) scheme, and a signal combiner for combining received signals with a Minimum Mean Square Error (MMSE) scheme.

5. The reception apparatus of claim 1, wherein the strength of the interference signal is a maximum value among power values of interference signals from interference base stations.

6. The reception apparatus of claim 1, wherein the strength of the interference signal is a power value of a sum of interference signals from interference base stations.

7. A method for receiving a signal using multiple antennas in a communication system, the method comprising the steps of:
    measuring strengths of signals received at the antennas;
    determining one of at least two signal combining schemes according to a ratio of strength of a received signal from a serving base station that presently provides a service signal, to strength of received signals from interference base stations that provide interference signals among the signals; and
    combining the signals received at the antennas using the determined signal-combining scheme,
    wherein determining one of the at least two signal combining schemes comprises:
    determining a first scheme for combining the signals based on a fixed number of pilots if the ratio is greater than a predetermined threshold; and
    determining a second scheme for combining the signals based on a variable number of pilots if the ratio is less than or equal to the predetermined threshold.

8. The method of claim 7, wherein the at least two signal combining schemes comprise a Maximum Ratio Combining (MRC) scheme and a Minimum Mean Square Error (MMSE) scheme.

9. The method of claim 7, wherein the step of measuring strengths of signals comprises:
    measuring signal strength using:

$$P^i = \sum_{n=1}^{N} |p_n^i|^2$$

where $|p_n^i|^2$ denotes a value obtained by measuring strength of the signal transmitted by an $i^{th}$ base station, received via an $n^{th}$ antenna.

10. The method of claim 7, wherein the strength of the received signals from the interference base stations is a maximum value among power values of the interference signals from the interference base stations.

11. The method of claim 7, wherein the strength of the received signals from the interference base stations is a power value of a sum of the interference signals from the interference base stations.

* * * * *